(12) United States Patent
Kuo et al.

(10) Patent No.: US 9,066,000 B2
(45) Date of Patent: *Jun. 23, 2015

(54) 3D AUTO-FOCUSING CAMERA MODULE AND 3D IMAGING METHOD USING SAME

(75) Inventors: Chang-Wei Kuo, New Taipei (TW); Ting-Yuan Wu, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 421 days.

This patent is subject to a terminal disclaimer.

(21) Appl. No.: 13/535,739

(22) Filed: Jun. 28, 2012

(65) Prior Publication Data

US 2013/0162782 A1    Jun. 27, 2013

(30) Foreign Application Priority Data

Dec. 27, 2011   (TW) .............................. 100148767 A

(51) Int. Cl.
| G03B 13/36 | (2006.01) |
| G02B 7/28 | (2006.01) |
| G06T 7/00 | (2006.01) |
| H04N 5/232 | (2006.01) |
| G06K 9/00 | (2006.01) |
| H04N 13/02 | (2006.01) |

(52) U.S. Cl.
CPC .......... *H04N 5/23212* (2013.01); *G06T 7/0075* (2013.01); *G03B 13/36* (2013.01); *G02B 7/28* (2013.01); *G06K 9/00201* (2013.01); *H04N 13/0239* (2013.01)

(58) Field of Classification Search
None
See application file for complete search history.

(56) References Cited

U.S. PATENT DOCUMENTS

| 5,231,443 | A * | 7/1993 | Subbarao ........................ 396/93 |
| 5,835,288 | A * | 11/1998 | Yamada et al. ............... 359/793 |
| 7,433,586 | B2 * | 10/2008 | Onozawa ....................... 396/121 |
| 8,248,511 | B2 * | 8/2012 | Robinson et al. ............. 348/335 |
| 8,325,265 | B2 * | 12/2012 | Chen .............................. 348/335 |
| 8,605,203 | B2 * | 12/2013 | Wu et al. ....................... 348/345 |
| 8,610,784 | B2 * | 12/2013 | Terashima ............... 348/208.12 |
| 8,786,959 | B2 * | 7/2014 | Wu et al. ....................... 359/698 |
| 2006/0038911 | A1 * | 2/2006 | Miyazaki ..................... 348/345 |
| 2007/0146689 | A1 * | 6/2007 | Araki et al. ................. 356/124.5 |
| 2008/0158346 | A1 * | 7/2008 | Okamoto et al. ............... 348/47 |
| 2011/0037964 | A1 * | 2/2011 | Imamura ...................... 356/3.13 |
| 2013/0162777 | A1 * | 6/2013 | Wu et al. ......................... 348/46 |
| 2013/0169595 | A1 * | 7/2013 | Chang et al. .................. 345/175 |

FOREIGN PATENT DOCUMENTS

WO    WO2010/071001    *  6/2010

* cited by examiner

*Primary Examiner* — William C Vaughn, Jr.
*Assistant Examiner* — Lindsay Uhu
(74) *Attorney, Agent, or Firm* — Novak Druce Connolly Bove + Quigg LLP

(57) ABSTRACT

A 3D AF camera module includes first and second imaging units, a storage unit, a color separation unit, a main processor unit, an image processing unit, first and second driving units, and an image combining unit. The first and second imaging units each capture an image of a scene from different angles. The color separation unit separates the images into red, green and blue colors. The main processor unit calculates MTF values of the images and determines a shooting mode of the 3D AF camera module. The image processing unit processes the images according to the MTF values to compensate for blurring of the images caused by being out of focus. The first and second driving units drive the first and second imaging units to points of optimum focuses according to MTF values. The image combining unit combines the images into a single 3D image.

9 Claims, 2 Drawing Sheets

3D AUTO-FOCUSING CAMERA MODULE AND 3D IMAGING METHOD USING SAME

BACKGROUND

1. Technical Field

The present disclosure relates to a three-dimensional (3D) auto-focusing (AF) camera module and a 3D imaging method using the 3D AF camera module.

2. Description of Related Art 3D camera modules are popular in many fields. In order to get sharp images, an AF function for a 3D camera module is needed.

Digital AF technology allows blurred images (out of focus images) to be processed by software modules, which may employ an extended depth of field (EDOF) technology, to achieve a sharper image. However, the digital AF technology does not work effectively if an object distance is short, e.g. less than 40 cm.

What is needed therefore is a 3D AF camera module and 3D imaging method using the 3D AF camera module to address the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
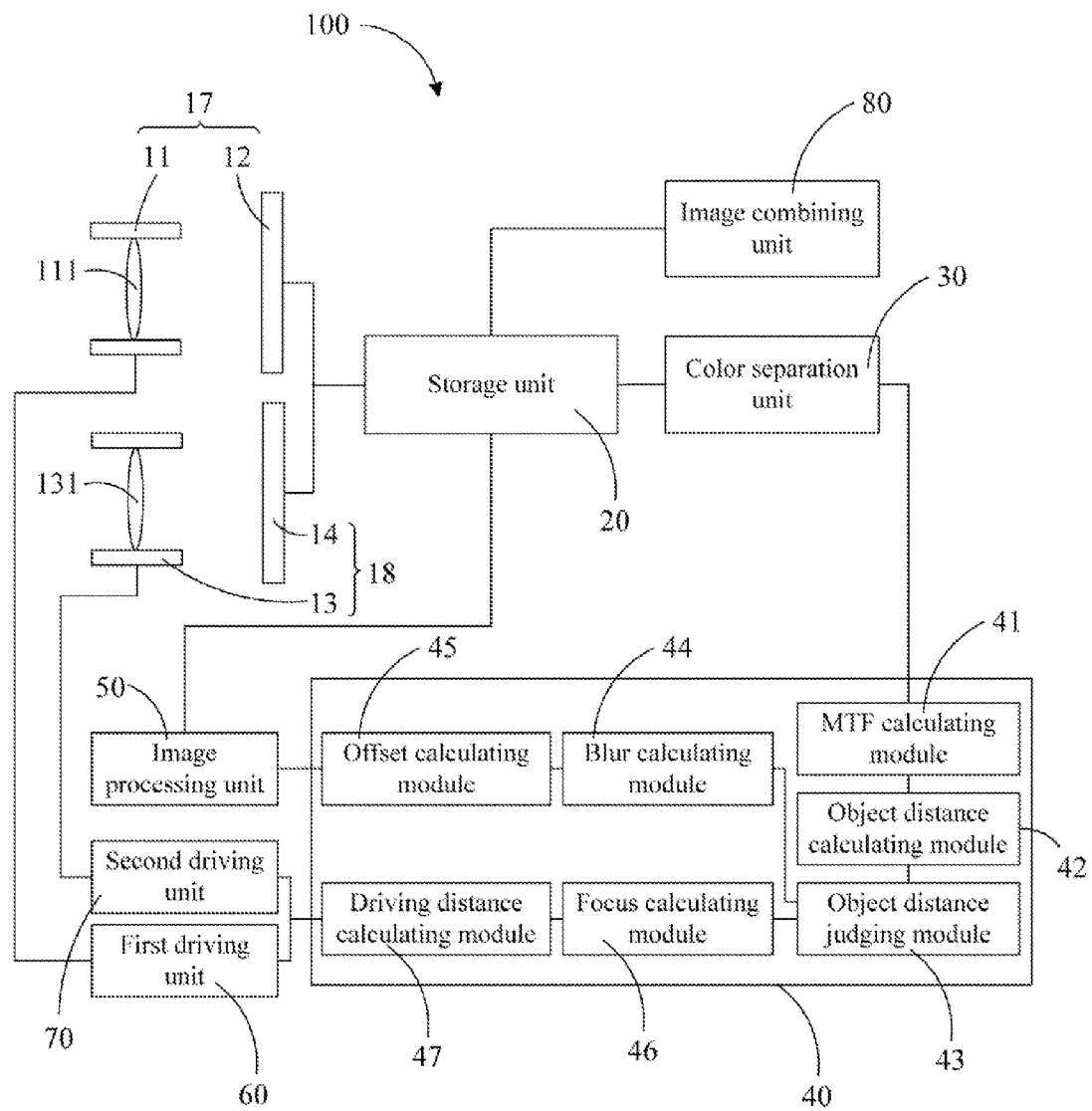
FIG. 1 is a schematic view of a 3D AF camera module, according to an exemplary embodiment of the present disclosure.

Referring to FIG. 1, a three-dimensional (3D) auto-focus (AF) camera module 100, according to an exemplary embodiment of the present disclosure, is shown. The 3D AF camera module 100 includes a first imaging unit 17 located at one point, a second imaging unit 18 at another point, a storage unit 20, a color separation unit 30, a main processor unit 40, an image processing unit 50, a first driving unit 60, a second driving unit 70, and an image combining unit 80. The storage unit 20 is electrically connected to the first imaging unit 17 and the second imaging unit 18. The color separation unit 30 is electrically connected to the storage unit 20. The main processor unit 40 is electrically connected to the color separation unit 30. The image processing unit 50, the first driving unit 60, and the second driving unit 70 are all electrically connected to the main processor unit 40. The first driving unit 60 is also connected to the first imaging unit 17, and the second driving unit 70 is connected to the second imaging unit 18. The image combining unit 80 is electrically connected to the storage unit 20.

The first imaging unit 17 includes a first lens module 11 and a first image sensor 12 aligned with the first lens module 11 along a first optical axis of the first imaging unit 17. The second imaging unit 18 includes a second lens module 13 and a second image sensor 14 aligned with the second lens module 13 along a second optical axis of the second imaging unit 18.

The first lens module 11 and the second lens module 13 each capture images of an object(s) and focus the images onto a sensing area of the first image sensor 12 or the second image sensor 14. The first lens module 11 includes at least one lens 111, and the second lens module 13 includes at least one lens 131. In this embodiment, the lenses 111 and 131 are aspherical lenses.

The first image sensor 12 senses the images captured by the first lens module 11, and the second image sensor 14 senses the images captured by the second lens module 13. The first image sensor 12 and the second image sensor 14 each include a number of pixel units arranged in the sensing area, each pixel unit includes a red pixel, a green pixel and a blue pixel. In the present embodiment, the number of the pixel units in each sensor is not less than 2048×1536. In this illustrated embodiment, the first image sensor 12 and the second image sensor 14 each can be a charge-coupled device (CCD) or a complementary metal oxide semiconductor (CMOS). The images sensed by the first image sensor 12 and the second image sensor 14 each comprise a number of image portions corresponding to the pixel units.

The storage unit 20 stores images sensed by the first image sensor 12 and by the second image sensor 14.

The color separation unit 30 separately breaks down images sensed by the first image sensor 12 and by the second image sensor 14 into red, green and blue colors. In detail, each image portion of the images is separated into a red color part, a green color part and a blue color part. The red color parts of the image portions construct a red image, the green parts of the image portions construct a green image, and the blue parts of the image portions construct a blue image.

The main processor unit 40 includes a modulation transfer function (MTF) calculating module 41, an object distance calculating module 42, an object distance judging module 43, a blur calculating module 44, an offset calculating module 45, a focus calculating module 46 and a driving distance calculating module 47. The MTF calculating module 41 is electrically connected to the color separation unit 30, the object distance calculating module 42 is electrically connected to the MTF calculating module 41, the object distance judging module 43 is electrically connected to the object distance calculating module 42, the focus calculating module 46 and the blur calculating module 44 are electrically connected to the object distance judging module 43. The offset calculating module 45 is electrically connected to the blur calculating module 44 and the image processing unit 50, and the driving distance calculating module 47 is electrically connected to the focus calculating unit 46, the first driving unit 60 and the second driving unit 70.

The MTF calculating module 41 calculates MTF values of each image portion of images sensed by the first image sensor 12 and the second image sensor 14. In this embodiment, the MTF calculating module 41 calculates MTF values of the red part, of the green part and of the blue part of each image portion of the images.

The object distance calculating module 42 calculates an object distance of an object in each image portion of the images according to the MTF values calculated by the MTF calculating module 41.

The object distance judging module 43 determines a shooting mode according to the object distances of the image portions calculated by the object distance calculating module 41. In detail, the object distance judging module 43 compares the object distances in each of the images so calculated with a predetermined distance value, and determines the shooting mode. In this embodiment, the object distance judging module 43 analyzes the object distances of the pixel units in each of the images and generates a main object distance representing the distance-to-object distance of a main object in relation to each of the two images. The predetermined distance value is used for distinguishing the shooting mode of the 3D AF camera module 100. In this embodiment, the predetermined distance value is 40 cm. If the main object distance is more than 40 cm, the 3D AF camera module 100 is set at a long shooting mode. If the main object distance is equal to or less than 40 cm, the 3D AF camera module 100 is set at a close shooting mode.

The blur calculating module 44 compares the MTF values of each image portion of the images calculated by the MTF calculating module 41 with predetermined MTF values, calculates the differences between the MTF values and the predetermined MTF values, and generates blur quantities of each image portion of each image. Each of the predetermined MTF values is an MTF value applying to the object in the image which is the sharpest, and the predetermined MTF values are different corresponding to different object distances. In this embodiment, the blur calculating module 44 calculates the blur quantities of the red part, of the green part and of the blue part of each image portion of the two images. The blur calculating module 44 may select on state or off state for the blur calculating function according to the shooting manner required, as determined by the object distance judging module 43. In this embodiment, if the 3D AF camera module 100 is set at a long shooting mode, the blur calculating module 44 switches on the blur calculating function for one or both groups of image portions, and if the 3D AF camera module 100 is set at a close shooting mode, the blur calculating module 44 switches off the blur calculating function for one or both groups of image portions.

The offset calculating module 45 calculates offsets to compensate for any blurring of each image portion according to the calculations of the blur calculating module 44. In this embodiment, the offset calculating module 45 calculates offsets of the red part, of the green part and of the blue part of each image portion of each sensing area.

The focus calculating module 46 calculates optimum focuses for the first lens module 11 and for the second lens module 13 according to the calculations of the object distance calculating module 42. The focus calculating module 46 may select on state or off state for the focus calculating function thereof according to the shooting manner determined as being required by the object distance judging module 43. In this embodiment, if the 3D AF camera module 100 is set at a long shooting mode, the focus calculating module 46 switches off the focus calculating function for one or both groups of image portions, and if the 3D AF camera module 100 is set at a close shooting mode, the focus calculating module 46 switches on the focus calculating function for one or both groups of image portions.

The driving distance calculating module 47 calculates driving distances of the image capturing lens 11 and of the image capturing lens 13 according to the optimum focuses for the lenses 111 and 131 as calculated by the focus calculating module 46.

The image processing unit 50 processes the images according to the calculations of the offset calculating module 45 to achieve two sharp processed images. In detail, the image processing unit 50 compensates for any blurring of each image portion of each of the images according to the offsets calculated by the offset calculating module 45. In this embodiment, the image processing unit 50 compensates for any blurring of the red color portion, of the green color portion and of the blue color portion of each group of image portions.

The first driving unit 60 and the second driving unit 70 respectively drive the first lens module 11 and the second lens module 13 to the points of optimum focuses according to the driving distances calculated by the driving distance calculating module 47. In this embodiment, the first driving unit 60 and the second driving unit 70 are piezoelectric actuators. Alternatively, the first driving unit 60 and the second driving unit 70 can be voice coil motors (VCM). Two images captured by the first lens module 11 and the second lens module 13 at the points of optimum focuses are stored in the storage unit 20.

The image combining unit 80 combines the two sharp processed images to generate a single 3D image or combines the two images captured by the first lens module 11 and the second lens module 13 at the points of optimum focuses to generate a single 3D image. In detail, the image combining unit 80 reads images of one scene captured by the first lens module 11 and the second lens module 13 at the same time from different angles, generates information about depth of field according to the different points of view of the first lens module 11 and of the second lens module 13, and combines the images into a single image according to the information about depth of fields. Thus the combined image can be said to contain three-dimensional information of the scene.

Figure 2:
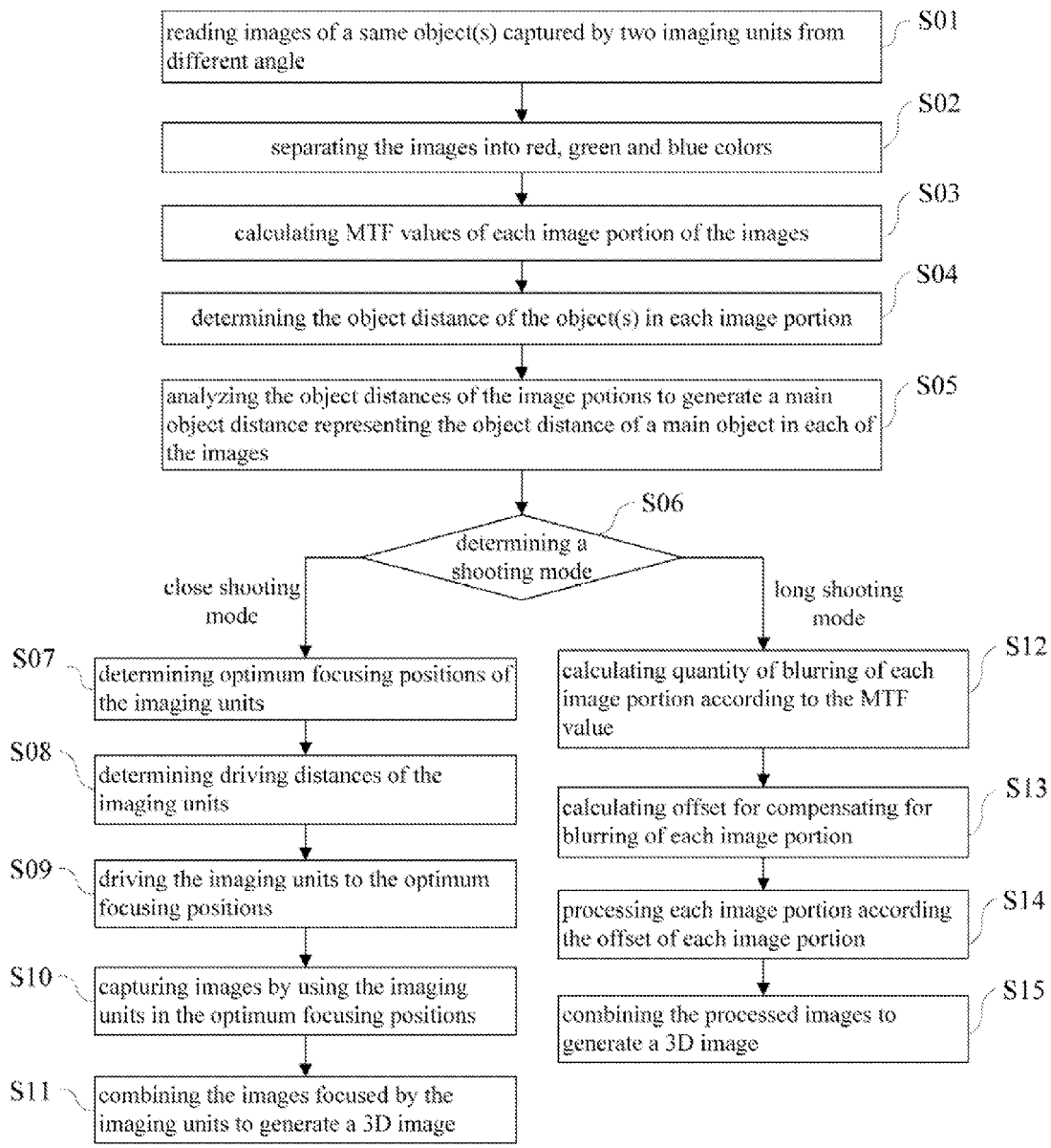
FIG. 2 is a flowchart of a 3D imaging method, according to an exemplary embodiment of the present disclosure.

Referring to FIG. 2, an exemplary embodiment of a 3D imaging method using the 3D AF camera module 100 is shown. The 3D imaging method includes the following steps:

In step S01, images of a same object captured by the first lens module 11 and the second lens module 13 from different angles are read;

In step S02, the images are separated into red, green, and blue colors. Each image portion of the images is separated into a red color part, a green color part and a blue color part.

In step S03, MTF values of each image portion of the images are calculated. The MTF values of the red parts, the green parts and the blue parts of each image portion are calculated.

In step S04, the object distance of the object(s) in each image portion is determined according to the MTF values of each image portion.

In step S05, a main object distance representing the object distance of a main object in each of the images is generated by analyzing the object distances of the image potions.

In step S06, a shooting mode of the 3D AF camera module 100 is determined according to the object distance of the object(s) in each image portion.

If the 3D AF camera module 100 is set at a close shooting mode, the following steps are executed:

In step S07, optimum focusing positions of the first lens module 11 and the second lens module 13 are determined according to the object distance of the object(s) in each image portion.

In step S08, driving distances of the first lens module 11 and the second lens module 13 are determined according to the optimum focusing positions.

In step S09 the first lens module 11 and the second lens module 13 are respectively driven to the optimum focusing positions according to the driving distances.

In step S10, the first lens module 11 and the second lens module 13 capture properly focused images.

In step S11, the images focused by the first lens module 11 and the second lens module 13 are combined to generate a 3D image.

If the 3D AF camera module 100 is set at a long shooting mode, the following step are executed:

In step S12, the quantity of blurring in each image portion is calculated according to the MTF values.

In step S13, offset for compensating blurring in each image portion is calculated according to the quantities of blurring of each image portion.

In step S14, each image portion is processed according to the offset of each image portion. Then, the processed images can be stored as properly focused image.

In step S15, the processed images are combined to generate a 3D image.

The 3D AF camera module 100 and the 3D imaging method using the 3D AF camera module 100 determine a shooting mode according an object distance and may select either a mechanical manner or a digital manner of application, thus a sharp 3D image can be generated whether an object distance is short or not.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A 3D AF camera module comprising:
   a first imaging unit for capturing an image of an object from a first angle;
   a second imaging unit for capturing another image of the object from a second angle different from the first angle;
   a storage unit for storing the images captured by the first imaging unit and the second imaging unit;
   a color separation unit for separating the images captured by the first imaging unit and the second imaging unit into red, green and blue colors;
   a main processor unit electrically connected to the color separation unit, the main processor unit being configured for calculating MTF values of the images and determining a shooting mode of the 3D AF camera module, wherein the shooting mode comprises a first shooting mode and a second shooting mode;
   an image processing unit electrically connected to the main processor unit and the storage unit, the image processing unit processing the images according to the MTF values calculated by the main processor unit to compensate blurs of each of the images caused by out of focus when the second shooting mode is selected, the storage unit configured for storing the processed images processed by the image processing unit;
   a first driving unit connected to the main processor unit, the first driving unit driving the first imaging unit to a first focusing position according to the MTF values calculated by the main processor unit when the first shooting mode is selected;
   a second driving unit connected to the main processor unit, the second driving unit driving the second imaging unit to a second focusing position according to the MTF values calculated by the main processor unit when the first shooting mode is selected, the storage unit configured for storing images captured by the first imaging unit in the first focusing position and the second imaging unit in the second focusing position; and
   an image combining unit electrically connected to the storage unit and configured for combining the processed images processed by the image processing unit to generate a 3D image or combining the images captured by the first imaging unit in the first focusing position and the second imaging unit in the second focusing position to generate a 3D image;
   wherein the first imaging unit comprises a first lens module and a first image sensor aligned with the first lens module along an optical axis of the first imaging unit, and the second imaging unit comprises a second lens module and a second image sensor aligned with the second lens module along an optical axis of the second imaging unit;
   wherein the first image sensor and the second image sensor each comprise a plurality of pixel units arranged in a sensing area thereof, each pixel unit comprises a red pixel, a green pixel and a blue pixel, an image sensed by the first image sensor or the second image sensor comprises a plurality of image portions, each of the image portions corresponds to a pixel unit;
   wherein the main processor unit comprises:
   a MTF calculating module configured for calculating MTF values of each image portion of the images;
   an object distance calculating module configured for calculating an object distance of the object in each image portion of the images according to the MTF values;
   an object distance judging module configured for determining the shooting mode according to the object distances;
   a blur calculating module configured for comparing the MTF values of each image portion calculated by the MTF calculating module with corresponding predetermined MTF values, calculating the differences between the MTF values and the predetermined MTF values, and generating blur quantities of each image portion of the images according to the MTF value differences;
   an offset calculating module configured for calculating offset to compensate a blur of each image portion according to the blur quantities;
   a focus calculating module configured for calculating the first and second focusing positions of the first lens module and the second lens module according to the object distances of the object in each image portion; and
   a driving distance calculating module configured for calculating driving distances of the first lens module and the second lens module according to the first and second focusing positions calculated by the focus calculating module.

2. The 3D AF camera module of claim 1, wherein the first lens module and the second lens module each comprise at least one piece of aspherical lens.

3. The 3D AF camera module of claim 1, wherein the MTF calculating module respectively calculates MTF values of each image portion of red, green and blue colors.

4. The 3D AF camera module of claim 3, wherein the object distance judging module analyzes the object distances calculated by the object judging module to get an analysis result, compares the analysis result with a predetermined distance value, and determines the shooting mode.

5. The 3D AF camera module of claim 4, wherein the object distance judging module analyzes the object distances of the image potions and generates a reference object distance representing the object distance of a reference object in each of the images.

6. The 3D AF camera module of claim 5, wherein the predetermined distance is 40 cm, if the reference object distance is more than 40 cm, the 3D AF camera module is set at the second shooting mode, and if the main object distance is equal to or less than 40 cm, the 3D AF camera module is set at the first shooting mode.

7. The 3D AF camera module of claim 1, wherein the first driving unit and the second driving unit are piezoelectric actuators.

8. A 3D imaging method, comprising:
   reading images of a same object captured by two imaging units from different angles;

separating the images into red, green and blue colors, wherein the images each comprise a plurality of image portions;

calculating MTF values of each image portion of the images;

determining the object distance of the object in each image portion according to the MTF values of each image portion;

analyzing the object distances of the image potions to generate a reference object distance representing the object distance of a reference object in each of the images;

selecting a first shooting mode upon a condition that the reference object distance is equal to or less than a predetermined distance value;

determining focusing positions of the imaging units according to the object distance of the object in each image portion;

determining driving distances of the imaging units according to the focusing positions;

driving the imaging units to the focusing positions according to the driving distances;

capturing images by using the imaging units in the focusing positions; and combining the images captured by the imaging units in the focusing positions to generate a 3D image.

9. The 3D imaging method of claim 8, comprising:

selecting a second shooting mode upon a condition that the reference object distance is more than a predetermined distance value;

calculating quantity of blurring of each image portion according to the MTF values;

calculating offset for compensating blurring of each image portion according to the quantity of blurring of each image portion;

processing each image portion according to the offset of each image portion; and combining the processed images to generate a 3D image.

* * * * *